United States Patent
Watanabe

(10) Patent No.: US 10,288,416 B2
(45) Date of Patent: May 14, 2019

(54) INTERFERENCE FRINGE PROJECTION APPARATUS AND MEASUREMENT APPARATUS

(71) Applicant: OLYMPUS CORPORATION, Hachioji-shi, Tokyo (JP)

(72) Inventor: Daichi Watanabe, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 16 days.

(21) Appl. No.: 15/813,955

(22) Filed: Nov. 15, 2017

(65) Prior Publication Data
US 2018/0073864 A1    Mar. 15, 2018

Related U.S. Application Data

(63) Continuation of application No. PCT/JP2015/002762, filed on Jun. 1, 2015.

(51) Int. Cl.
*G01B 11/24* (2006.01)
*G01B 11/25* (2006.01)
*G01B 9/02* (2006.01)

(52) U.S. Cl.
CPC ...... *G01B 11/2441* (2013.01); *G01B 9/02001* (2013.01); *G01B 11/25* (2013.01)

(58) Field of Classification Search
None
See application file for complete search history.

(56) References Cited

U.S. PATENT DOCUMENTS

| | | | |
|---|---|---|---|
| 5,146,293 A * | 9/1992 | Mercer | G01B 11/2441 356/512 |
| 5,434,669 A | 7/1995 | Tabata et al. | |

(Continued)

FOREIGN PATENT DOCUMENTS

| | | |
|---|---|---|
| JP | 03225206 A | 10/1991 |
| JP | 05087543 A | 4/1993 |

(Continued)

OTHER PUBLICATIONS

International Search Report (ISR) and Written Opinion dated Jul. 28, 2015 issued in International Application No. PCT/JP2015/002762.

*Primary Examiner* — Tri T Ton
*Assistant Examiner* — Rufus L Phillips
(74) *Attorney, Agent, or Firm* — Holtz, Holtz & Volek PC

(57) ABSTRACT

An interference fringe projection apparatus includes light source units that selectively emit light from a coherent light source from one of a plurality of optical emitters, a polarization-maintaining waveguide unit with a plurality of PANDA fibers (polarization-maintaining waveguides) that each guide light emitted from one of the plurality of optical emitters, polarization splitters that split an optical path of light emitted from each of the PANDA fibers by polarization direction, and a polarizing film that transmits only a linear polarization component in a particular direction of light split by the polarization splitter. The light source unit only emits linearly polarized light in one polarization-maintaining direction for at least one of the PANDA fibers, and the polarization-maintaining waveguide unit causes retardation of light emitted from the PANDA fibers to vary.

7 Claims, 11 Drawing Sheets

(56) References Cited

U.S. PATENT DOCUMENTS

2007/0133010 A1* 6/2007 Klooster ............ G01B 11/2441
356/512
2010/0008588 A1* 1/2010 Feldkhun ........... G01B 11/2518
382/206

FOREIGN PATENT DOCUMENTS

| JP | 2006064451 A | 3/2006 |
| JP | 2007178409 A | 7/2007 |

* cited by examiner

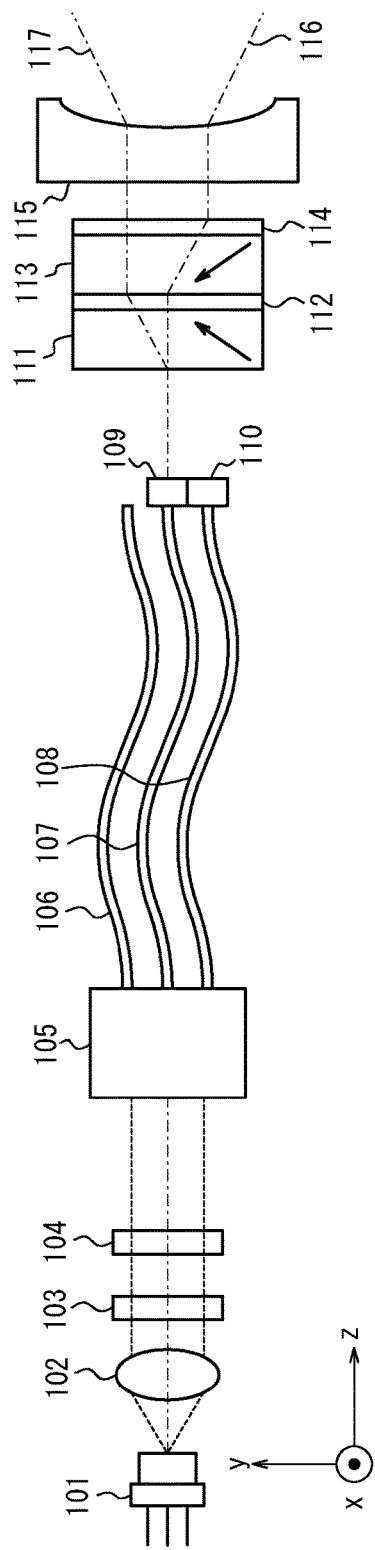
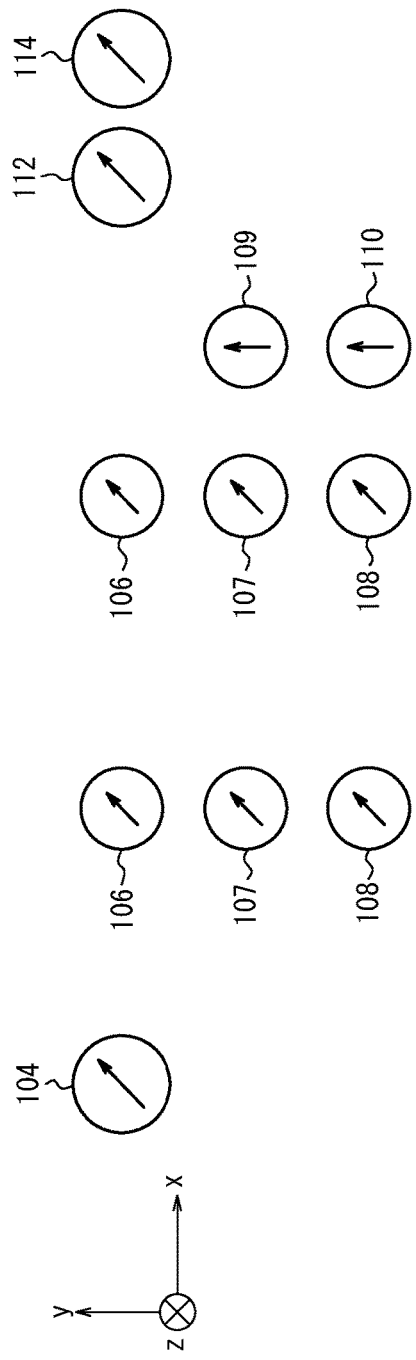
FIG. 1A
FIG. 1B

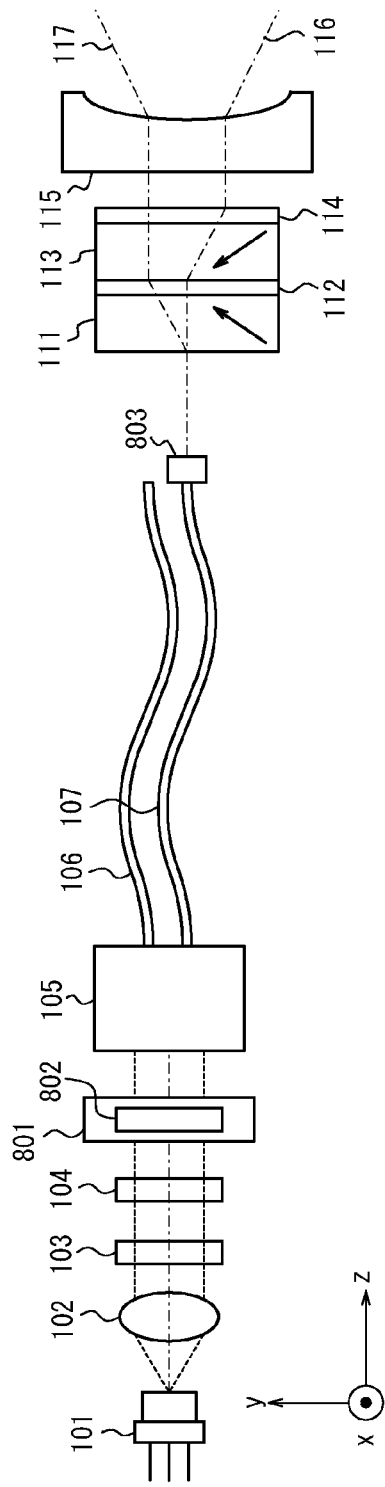
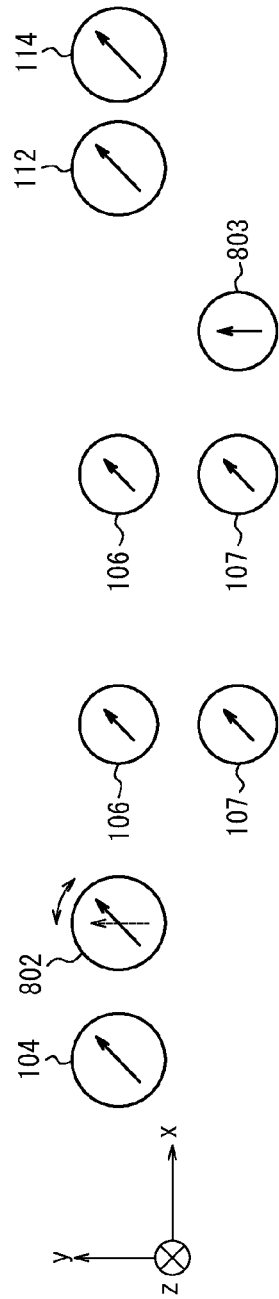
FIG. 8A
FIG. 8B

INTERFERENCE FRINGE PROJECTION APPARATUS AND MEASUREMENT APPARATUS

CROSS-REFERENCE TO RELATED APPLICATION

The present application is a Continuing Application based on International Application PCT/JP20151002762 filed on Jun. 1, 2015, the entire disclosure of this earlier application being incorporated herein by reference.

TECHNICAL FIELD

The present disclosure relates to an interference fringe projection apparatus used in 3D shape measurement and to a measurement apparatus using the same.

BACKGROUND

A non-contact method of measuring the 3D shape of an object surface using a diffraction pattern of laser light from a diffraction grating is generally known (for example, patent literature (PTL) 1). In this method, a line-shaped diffraction pattern is projected onto a measured object surface, and the projected image is observed from a predetermined position with an imaging device, such as a solid-state imaging device. Since the line-shaped pattern that is observed changes shape in accordance with the unevenly shaped surface of the measured object, the 3D shape of the surface to be measured is calculated by analyzing the imaged pattern.

For example, PTL 1 discloses a measurement apparatus disposed at the tip of an endoscope. In this measurement apparatus, a laser beam for interference fringe projection is guided using a polarization-maintaining fiber. Two laser beams of linearly polarized light, having mutually orthogonal polarization directions, are caused to be incident at the incident side of the polarization-maintaining fiber, so that the respective polarization directions become the polarization-maintaining directions of the polarization-maintaining fiber. A birefringent plate is placed at the exit-side of the polarization-maintaining fiber so that one of the polarization-maintaining directions of the polarization-maintaining fiber matches the direction of the optical axis. As a result, the light beam emitted from the polarization-maintaining fiber is separated in two. Furthermore, by providing a polarizing plate with a transmission axis inclined 45° relative to the optical axis of the birefringent plate, only the coherent components are extracted from among the two polarization components and projected onto the measured object to generate an interference fringe. According to PTL 1, a mechanism to adjust the phase difference of the two laser beams of linearly polarized light is provided at the light source side of the polarization-maintaining fiber, and the interference fringe projected on the measured object can be scanned. As a result, the shape of the measured object is calculated and output on the basis of the principle of fringe scanning.

CITATION LIST

Patent Literature

PTL 1: JP H5-87543 A

SUMMARY

An interference fringe projection apparatus according to one aspect of the present disclosure includes:

a light source unit configured to emit coherent light selectively one of a plurality of optical emitters;

a polarization-maintaining waveguide unit comprising a plurality of polarization-maintaining waveguides each configured to guide light emitted from one of the plurality of optical emitters;

a polarization splitter configured to split an optical path of light emitted from the polarization-maintaining waveguides by polarization direction; and a polarizer configured to transmit only a linear polarization component in a particular direction of light split by the polarization splitter, wherein the light source unit is configured to allow emission of only linearly polarized light in one polarization-maintaining direction for at least one polarization-maintaining waveguide among the plurality of polarization-maintaining waveguides, and the polarization-maintaining waveguide unit is configured to cause retardation of light emitted from the plurality of polarization-maintaining waveguides to vary for each polarization-maintaining waveguide.

The light source unit may include one light source and an optical emitter selection unit configured to switch an optical path of light from the light source and to select one of the plurality of optical emitters.

The light source unit may include a plurality of light sources in one-to-one correspondence with the plurality of optical emitters and may be configured to selectively cause one of the plurality of light sources to emit light.

At least one polarization-maintaining waveguide among the plurality of polarization-maintaining waveguides is preferably arranged so that a polarization-maintaining direction of the at least one polarization-maintaining waveguide is a direction that bisects a polarization direction of light split in the polarization splitter.

The polarization-maintaining waveguide unit more preferably includes a retarder on an optical emission end side of at least one of the polarization-maintaining waveguides, and the retarder is more preferably arranged so that a direction of an optical axis of the retarder is in any one polarization direction split by the polarization splitter.

The light source may include a half-wave plate and a half-wave plate rotation system that rotates the half-wave plate and controls a polarization direction of light incident on the polarization-maintaining waveguide unit.

The polarization-maintaining waveguide unit may include a phase modulator configured to control a phase difference between two beams of polarized light that pass through at least one of the polarization-maintaining waveguides and are split by the polarization splitter.

A measurement apparatus according to one aspect of the present disclosure includes:

one of the above interference fringe projection apparatuses;

an imager; and a calculator, wherein the imager captures an image of an object, an interference fringe being projected on the object by the interference fringe projection apparatus, and the calculator derives a shape of the object using the interference fringe in the image of the object and a positional relationship between the interference fringe projection apparatus and the imager.

BRIEF DESCRIPTION OF THE DRAWINGS

In the accompanying drawings:

FIGS. 1A and 1B illustrate the configuration of an interference fringe projection apparatus according to Embodiment 1, where FIG. 1A is a configuration diagram of an optical system, and FIG. 1B illustrates the orientation of each optical element;

FIG. 5A is a view from the +x direction, and FIG. 5B is a view from the −z direction;

FIG. 7A is a configuration diagram of an optical system, and FIG. 7B illustrates the orientation of each optical element;

FIGS. 8A and 8B illustrate the configuration of an interference fringe projection apparatus according to Embodiment 3, where FIG. 8A is a configuration diagram of an optical system, and FIG. 8B illustrates the orientation of each optical element;

FIG. 9A is a configuration diagram of an optical system, and FIG. 9B illustrates the orientation of each optical element;

DETAILED DESCRIPTION

Figure 2:
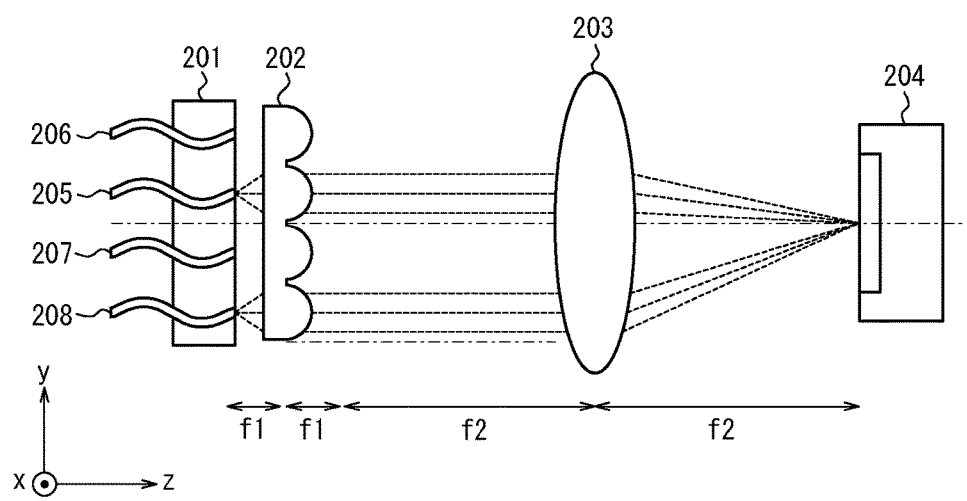
FIG. 2 illustrates the configuration of the optical switch in FIG. 1A.

In a conventional measurement apparatus, upon causing polarized light to propagate in two polarization-maintaining directions of a polarization-maintaining fiber, a difference in optical path length occurs between the two beams of polarized light as a result of birefringence of the polarization-maintaining fiber. Accordingly, the phase difference is controlled taking this difference in optical path length into account. In the polarization-maintaining fiber, however, if the state of the fiber changes because of bending, a change in temperature, or the like, then the optical path length may change, and an unexpected shift in the interference fringe may occur.

To address these concerns, it would be helpful to provide an interference fringe projection apparatus and a measurement apparatus that can reduce the shift that external influence causes in an interference fringe and can project a plurality of interference fringes with different phases.

Embodiments of this disclosure are described below with reference to the drawings.

Embodiment 1

FIGS. 1A and 1B illustrate the configuration of an interference fringe projection apparatus according to Embodiment 1, where FIG. 1A is a configuration diagram of an optical system, and FIG. 1B illustrates the orientation of each optical element. FIG. 1B indicates the direction of the transmission axis or the optical axis of the optical element with the corresponding reference numeral. The same is true for FIGS. 7B, 8B, and 9B below.

As illustrated in FIG. 1A, an interference fringe projection apparatus includes a semiconductor laser 101 as an illumination light source and includes, in the order of transmission of light emitted from the semiconductor laser 101, a collimator lens 102, a half-wave plate 103, a polarizing plate 104, an optical switch 105 (optical emitter selection unit), polarization-maintaining and absorption-reducing (PANDA) fibers 106, 107, and 108 (polarization-maintaining waveguide), a one-third-wave plate 109 (retarder), a two-thirds-wave plate 110 (retarder), rutile 111, a half-phase retardation film 112, rutile 113, a polarizing film 114 (polarizer), and a wide-angle projection lens 115.

The light source unit in this embodiment includes the semiconductor laser 101, the collimator lens 102, the half-wave plate 103, the polarizing plate 104, and the optical switch 105, and the polarization-maintaining waveguide unit includes the PANDA fibers 106, 107, and 108, the one-third-wave plate 109, and the two-thirds-wave plate 110. The polarization splitter includes the rutile 111, the half-phase retardation film 112, and the rutile 113. Furthermore, the portion that emits light from the optical switch 105 to the PANDA fibers 106, 107, and 108 is referred to as an optical emitter.

In FIGS. 1A and 1B and the figures below, the direction along the principal light ray of light emitted from the semiconductor laser 101 is considered to be the z-direction, and the directions orthogonal to each other in a plane orthogonal to the z-direction are considered to be the x-direction and the y-direction. The y-direction is a direction along the plane of the paper in this specification, and the x-direction is perpendicular to the plane of the paper.

Light emitted from the semiconductor laser 101 is formed as a parallel light beam by the collimator lens 102, passes through the half-wave plate 103 and the polarizing plate 104, and is guided through the optical switch 105 to one of the PANDA fibers 106, 107, and 108. The light guided to the PANDA fiber 106 is emitted from the emission end of the PANDA fiber 106 as is. On the other hand, the light guided to the PANDA fiber 107 is emitted with a change in the polarization state caused by the one-third-wave plate 109 provided at the emission-side end face. The light guided to the PANDA fiber 108 is emitted with a change in the polarization state caused by the two-thirds-wave plate 110 provided at the emission-side end face. When the emitted light passes through the rutile 111, half-phase retardation film 112, and rutile 113, the optical paths are branched by the polarization direction. Each beam of the branched light passes through the polarizing film 114 to become linearly polarized light having a polarization component only in the transmission axis direction of the polarizing film 114. The light transmitted by the polarizing film 114 is formed into an illumination light beam by the wide-angle projection lens 115. The illumination light projected at this time forms an interference fringe.

The light emitted by the semiconductor laser 101 is coherent, and the wavelength thereof is, for example, 650 nm. All of the optical elements are optimized to function for 650 nm light. Furthermore, an anti-reflection film is preferably applied to the boundary surface of the members through which light passes. The semiconductor laser 101 may, of course, be a laser of a different wavelength, a variable wavelength laser, a light source unit that emits light of multiple wavelengths, or the like.

The polarizing plate 104 is arranged so that the transmission axis thereof is parallel to the x-y plane and at a 45° angle relative to the x-axis. Only linearly polarized light that is parallel to the transmission axis is transmitted by the polarizing plate 104. The half-wave plate 103 is disposed by adjusting the direction of the optical axis thereof to maximize the amount of light transmitted by the polarizing plate 104.

The optical switch 105 guides incident light to the desired PANDA fiber 106, 107, or 108 by switching the optical path in accordance with a control signal from a non-illustrated controller unique to the interference fringe protection apparatus or from the controller or the like of the below-described measurement apparatus in the case of being embedded in the measurement apparatus.

With reference to FIG. 2, the optical switch 105 is described. FIG. 2 illustrates the configuration of the optical switch 105 in FIG. 1A.

The optical switch 105 is configured by a fiber array 201, a microlens array 202, a lens 203, and a microelectromechanical systems (MEMS) mirror 204. The focal distances of the microlens array 202 and the lens 203 are respectively f1 and f2. The fiber array 201 further includes an optical input port 205 and optical output ports 206, 207, and 208. Light transmitted by the polarizing plate 104 is guided to and caused to enter the optical input port 205 by a non-illustrated coupling lens. The optical output ports 206, 207, and 208 are coupled to the respective PANDA fibers 106, 107, and 108. The optical output ports 206, 207, and 208 constitute the optical emitter.

The microlens array 202 is disposed at a position f1 from the fiber array 201, the lens 203 is disposed at a position f1+f2 from the microlens array 202, and the MEMS mirror 204 is disposed at a position f2 from the lens 203. Furthermore, the MEMS mirror 204 is arranged so that the axis of rotation of the MEMS mirror 204 is positioned on the optical axis of the lens 203.

As a result, light emitted from the optical input port 205 is formed as a parallel light beam by the microlens array 202 and is incident on the lens 203. The light incident on the lens 203 becomes convergent light and is focused on the MEMS mirror 204. The light focused on the MEMS mirror 204 is deflected in accordance with the deflection angle of the MEMS mirror 204 and is incident on the lens 203. The light incident on the lens 203 is formed as a parallel light beam and is focused on one of the optical output ports 206, 207, and 208 via the microlens array 202.

The optical switch 105 focuses light on the desired one of the optical output ports 206, 207, 208 by controlling the deflection angle of the MEMS mirror 204 in accordance with a control signal from the non-illustrated controller. In this way, light can be selectively emitted to any one of the PANDA fibers 106, 107, and 108. At this time, the direction of the polarization direction due to the polarizing plate 104 is assumed not to change. Various configurations are possible for the optical switch 105, as illustrated by the below-described modification.

The PANDA fibers 106, 107, and 108 are polarization-maintaining fibers that use birefringence. In a polarization-maintaining fiber, the direction with a high refractive index and the direction with a low refractive index are respectively referred to as the slow axis and fast axis, and polarized waves are maintained with respect to these axes for guided light. In other words, when considering light incident on one end of the polarization-maintaining fiber as being divided into two linear polarization components in the slow axis direction and the fast axis direction, then light of the linear polarization component parallel to the slow axis is emitted from the other end of the polarization-maintaining fiber as linearly polarized light parallel to the slow axis, and light of the linear polarization component parallel to the fast axis is emitted from the other end of the polarization-maintaining fiber as linearly polarized light parallel to the fast axis. The PANDA fibers 106, 107, and 108 are arranged so that the slow axis thereof is parallel to the x-y plane and at a 45° angle relative to the x-axis. FIG. 1B illustrates the slow axis direction of the incident end and the emission end of the PANDA fibers 106, 107, and 108.

By disposing the polarizing plate 104 and the PANDA fibers 106, 107, and 108 in the above-described way, the light that can exist within the PANDA fibers 106, 107, and 108 is only linearly polarized light that is parallel to the slow axis. In other words, the light source unit is configured to emit only linearly polarized light, in a direction along one of the polarization-maintaining directions, to all of the plurality of PANDA fibers 106, 107, and 108.

In this way, by setting the direction of the slow axis of the PANDA fibers 106, 107, and 108 to be at a 45° angle relative to the x-axis, the light before incidence on the rutile 111 has equal polarization components in the x-direction and the y-direction, as described below. As a result, the light incident on the rutile 111 is bisected into two polarization components, ordinary light and extraordinary light. In other words, the PANDA fibers 106, 107, and 108 are arranged so that the polarization-maintaining directions thereof are directions that bisect the polarization directions of light that is split in the polarization splitter.

The light emitted from the PANDA fiber 106 is linearly polarized light parallel to the x-y plane and at a 45° angle relative to the x-axis. When considering this polarized light by dividing the light into components in the x-direction and the y-direction, the amplitudes are equal, and the phase difference is 0 rad.

The light emitted from the PANDA fiber 107 is emitted to the rutile 111 through the one-third-wave plate 109. As illustrated in FIG. 1B, the one-third-wave plate 109 is arranged so that the optical axis thereof faces the y-direction. As a result, when considering the light emitted by the one-third-wave plate 109 by dividing the polarized light into components in the x-direction and the y-direction, the amplitudes are equal, and the phase difference is $2\pi/3$ rad.

The light emitted from the PANDA fiber 108 is emitted to the rutile 111 through the two-thirds-wave plate 110. As illustrated in FIG. 1B, the two-thirds-wave plate 110 is arranged so that the optical axis thereof faces the y-direction. As a result, when considering the light emitted by the two-thirds-wave plate 110 by dividing the polarized light into components in the x-direction and the y-direction, the amplitudes are equal, and the phase difference is $4\pi/3$ rad.

In this way, the polarization-maintaining waveguide unit is configured to vary the retardation (the phase difference between polarization components), for each of the plurality of PANDA fibers 106, 107, and 108, of the light emitted from the PANDA fibers 106, 107, and 108.

The rutiles 111 and 113 are uniaxial birefringent crystals and are, for example, flat plates each having a thickness of 0.35 mm. The angle between the optical axis thereof and a normal to the surface of the flat plate can be set to 48°. FIG. 1A indicates the direction of the optical axis of each rutile with an arrow. This angle is a condition for maximizing the split width by which the rutile splits the polarized light. The condition for maximizing the split width of the birefringent crystal flat plate is that the angle between the optical axis and the normal to the surface of the flat plate be $\arctan(n_e/n_o)$, where $n_o$ and $n_e$ are the refractive indices of the birefringent crystal for ordinary light and extraordinary light, respectively.

The optical axes of the rutile 111 and the rutile 113 are arranged to be parallel to the y-z plane and not to be parallel to each other. In other words, the optical axes of the rutile 111 and the rutile 113 are inverted only in the z-direction. The half-phase retardation film 112 is disposed between the rutile 111 and the rutile 113 so that the optical axis thereof is at a 45° angle relative to the x-axis in the x-y plane. As a result, the polarization direction of a light beam 116 passing through the rutile 111 as ordinary light is rotated upon the light beam 116 passing through the half-phase retardation film 112. The light beam 116 then passes through the rutile 113 as extraordinary light. The polarization direction of a light beam 117 passing through the rutile 111 as extraordinary light is rotated upon the light beam 117 passing through the half-phase retardation film 112. The light beam 117 then passes through the rutile 113 as ordinary light.

At this time, upon looking at the optical emission point of any of the PANDA fibers 106, 107, and 108 through the rutile 113, half-phase retardation film 112, and rutile 111, two virtual images are observed at positions symmetrical with respect to the principal light rays of each of the PANDA fibers 106, 107, and 108 in the x-y plane.

The polarizing film 114 is arranged so that the transmission axis thereof is at a 45° angle relative to the x-axis in the x-y plane. The light beams 116, 117 whose optical paths are branched by the rutile 111, half-phase retardation film 112, and rutile 113 are polarization components that are orthogonal to each other and do not form an interference fringe by virtue of not being coherent. However, the polarizing film 114, which only transmits a linear polarization component in a particular direction, is used to extract only the polarization components that are coherent, thereby allowing interference fringes to be formed.

The wide-angle projection lens 115 is a concave lens and expands the diverging angle of the light beams emitted from the PANDA fibers 106, 107, and 108. The wide-angle projection lens 115 may be a convex lens instead, in which case the light passing through the wide-angle projection lens 115 diverges after first converging.

The brightness distribution of an interference fringe is given by the following formula, where the positions at which two virtual images are observed upon looking at the optical emission point of any of the PANDA fibers 106, 107, and 108 through the wide-angle projection lens 115, polarizing film 114, rutile 113, half-phase retardation film 112, and rutile 111 are wave sources, the distances from the wave sources to the observation point are $r_1$ and $r_2$, the phase difference of light emitted from each wave source is $\delta$, the amplitude is A, and the wavenumber is k. Consequently, the interference fringe pattern changes in accordance with the phase difference between the two light beams.

$$\frac{A^2}{2r_1^2} + \frac{A^2}{2r_2^2} + \frac{A^2}{r_1 r_2}\cos(-kr_1 + kr_2 + \delta)$$

(A: amplitude; $r_1$, $r_2$: distance; k: wavenumber; $\delta$: phase difference)

The phase difference between the two light beams in this example corresponds to the phase difference between the x-direction component and y-direction component of the light incident on the rutile 111. Because of the one-third-wave plate 109 and two-thirds-wave plate 110 provided at the emission end, the phase difference between the x-direction component and y-direction component of the light emitted to the rutile 111 differs depending on the PANDA fiber that guided the light and is respectively 0 rad, $2\pi/3$ rad, and $4\pi/3$ rad for the PANDA fibers 106, 107, and 108. In other words, the projected interference fringe pattern can be switched by using the optical switch 105 to switch between the PANDA fibers 106, 107, and 108 that emit light. Furthermore, since the light that can exist in the PANDA fibers 106, 107, and 108 is only linearly polarized light that is parallel to the slow axis, the polarization of the light emitted from the PANDA fibers 106, 107, and 108 does not change because of bending or temperature changes of the PANDA fibers 106, 107, and 108. In other words, the desired interference fringe pattern can be projected regardless of bending or temperature changes of the PANDA fibers 106, 107, and 108.

As described above, according to this embodiment, by selecting one of a plurality of optical emitters, coherent light of the semiconductor laser 101 is emitted to one of the PANDA fibers 106, 107, and 108 as linearly polarized light in a direction along the polarization-maintaining direction of the one of the PANDA fibers 106, 107, and 108. Furthermore, the retardation of light emitted from each of the plurality of PANDA fibers 106, 107, and 108 is caused to differ by providing the one-third-wave plate 109 and the two-thirds-wave plate 110. Therefore, the shift, in the interference fringe, due to the effect of external heat or bending can be reduced, and a plurality of interference fringes with different phases can be projected.

(Modification to Optical Switch)

Figure 3:
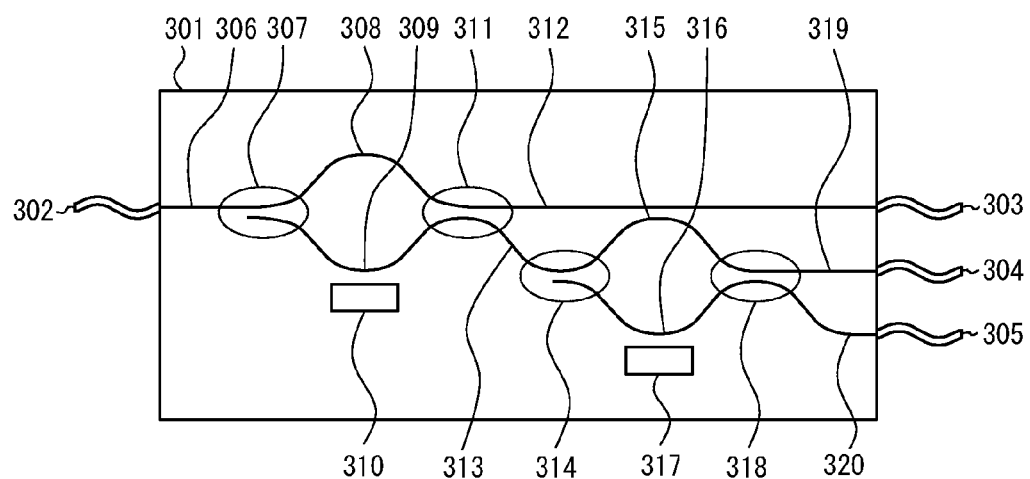
FIG. 3 illustrates a modification to the optical switch in FIG. 1A.

A modification to the optical switch is described with reference to FIG. 3. An optical switch 301 includes an optical input port 302, optical output ports 303, 304, and 305 (optical emitters), waveguides 306, 308, 309, 312, 313, 315, 316, 319, and 320, mode couplers 307, 311, 314, and 318, and heaters 310 and 317.

The waveguides 306, 308, 309, 312, 313, 315, 316, 319, and 320 are glass that is layered on a silicon substrate. Light guided by total reflection using the difference in refractive index is prevented from leaking outside the waveguides.

The mode couplers 307, 311, 314, and 318 are brought close to the waveguides 306, 308, 309, 312, 313, 315, 316, 319, and 320 and have the function of branching light by causing mode coupling. In the mode coupler 307, the waveguides 306 and 308 are connected, and the waveguide 309 is subjected to mode coupling. At this time, the optical path from the waveguide 306 to the waveguide 308 is referred to as a straight path, and the optical path from the waveguide 306 to the waveguide 309 is referred to as a crossed path. Light guided over a crossed path is delayed by a phase of $\pi$ rad from light guided over a straight path.

The length of the waveguides 308 and 309 is equal between the mode couplers 307 and 311. The waveguide 309 includes the heater 310. The heater 310 heats the waveguide 309 to a desired temperature in accordance with a control signal from a non-illustrated controller. Since the refractive index of the waveguide 309 changes because of heating, the optical path length of the waveguide 309 changes. When the change in optical path length is exactly (2n−1)π, the light guided by the waveguide 306 is guided to the waveguide 312 by an interference effect. When the change in optical path length is 2nπ, the light guided by the waveguide 306 is guided to the waveguide 313. In other words, the optical path can be switched by controlling the heating temperature of the heater 310. Similarly, the waveguides 313, 315, 316, 319, and 320, the mode couplers 314 and 318, and the heater 317 function as a switch for switching the optical path. A 1×3 optical switch is formed by using two of the switches for switching the optical path in FIG. 3.

(Modification to Light Source Unit)

Figure 4:
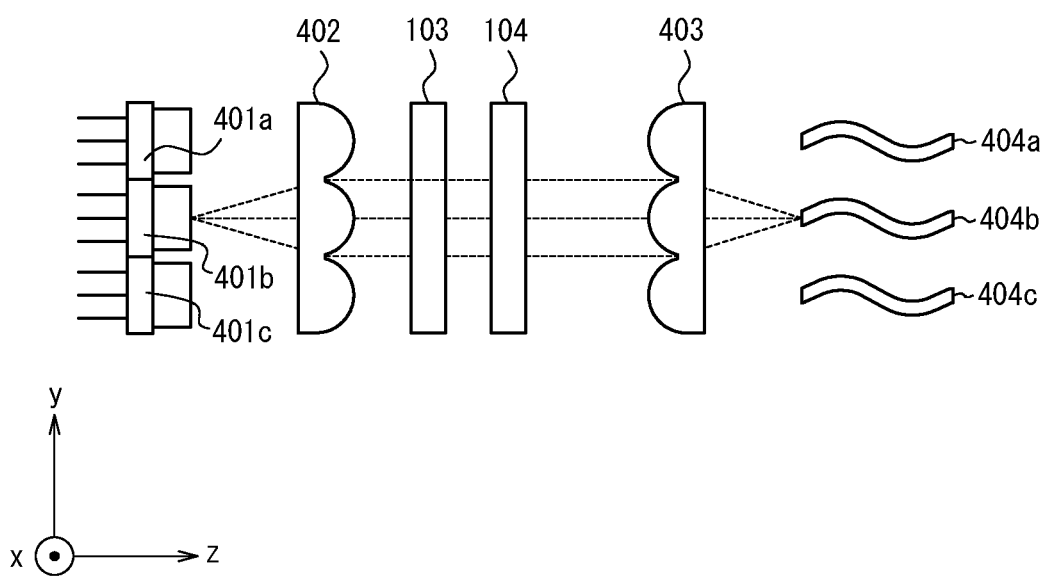
FIG. 4 illustrates a modification to the light source unit of the interference fringe projection apparatus in FIG. 1A.

FIG. 4 illustrates a modification to the light source unit. This light source unit is provided with three semiconductor lasers 401a, 401b, and 401c (light sources) arranged in the y-direction, a collimator lens array 402, the half-wave plate 103, the polarizing plate 104, a microlens array 403, and output ports 404a, 404b, and 404c (optical emitters). The output ports 404a, 404b, and 404c are respectively connected to the PANDA fibers 106, 107, and 108. The same reference numerals are assigned to constituent elements that are the same as those illustrated in FIG. 1A.

The semiconductor lasers 401a, 401b, and 401c respectively output coherent light of the same wavelength. The collimator lens array 402 includes microlenses arranged facing the semiconductor lasers 401a, 401b, and 401c and form the light emitted from the semiconductor lasers 401a, 401b, and 401c as parallel light. The microlens array 403 focuses the light beams made parallel by the collimator lenses in the collimator lens array 402 onto the output ports 404a, 404b, and 404c. Accordingly, the light sources 401a, 401b, and 401c each correspond to one of the output ports 404a, 404b, and 404c.

The light sources 401a, 401b, and 401c are connected to a non-illustrated controller, and by the controller selectively causing light to be emitted from the output ports 404a, 404b, and 404c, light is emitted to the PANDA fibers 106, 107, and 108 selectively from one of the output ports 404a, 404b, and 404c. As a result, similar effects as those of the light source unit in Embodiment 1 are obtained.

(Modification to Polarization Splitter)

Figure 5A:
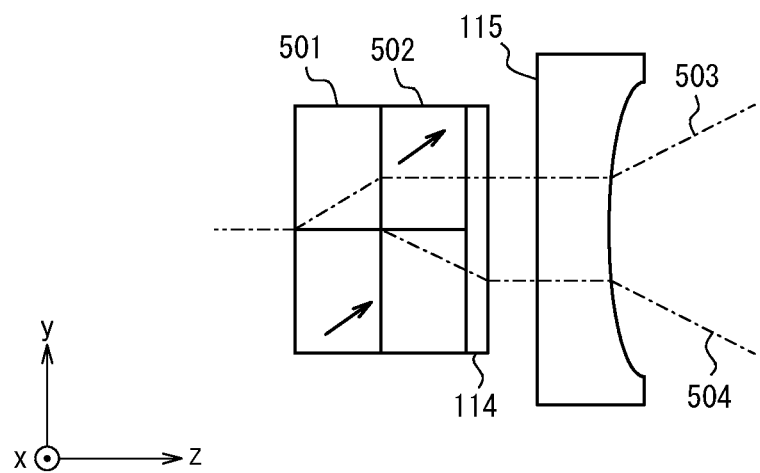
FIGS. 5A and 5B illustrate modifications to the polarization splitter of the interference fringe projection apparatus in FIG. 1A, where
Figure 5B:
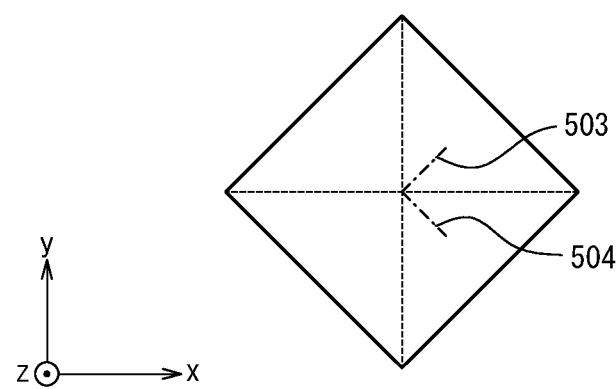

FIGS. 5A and 5B illustrate modifications to the polarization splitter of the interference fringe projection apparatus in FIG. 1A, along with the polarizing film 114 and the wide-angle projection lens 115, where FIG. 5A is a view from the +x direction, and FIG. 5B is a view from the −z direction. The polarization splitter is constituted by rutile 501 and rutile 502 in the order of passage of light, i.e. from the light source unit side.

The rutiles 501 and 502 are uniaxial birefringent crystals and are, for example, flat plates each having a thickness of 0.35 mm. The optical axis thereof is at an angle of 48° relative to a normal to the flat plate. This angle is a condition for maximizing the split width by which the rutile splits the polarized light. The condition for maximizing the split width of the birefringent crystal flat plate is that the angle between the optical axis and the normal to the flat plate be arctan $(n_e/n_o)$, where $n_o$ and $n_e$ are the refractive indices of the birefringent crystal for ordinary light and extraordinary light, respectively.

The optical axes of the rutile 501 and the rutile 502 are now described. First, a rutile flat plate that has an optical axis parallel to the y-z plane and at a 48° angle to the z-axis is considered. Rotating this flat plate by +45° relative to the z-axis yields the rutile 501, and rotating by −45° yields the rutile 502.

Here, the light passing through the rutile 501 and the rutile 502 is considered using the principal light ray. The light incident on the rutile 501 is branched into ordinary light and extraordinary light. The light 503 passing through the rutile 501 as extraordinary light is refracted in a direction parallel to the x-y plane at +45° relative to the x-axis and passes through the rutile 502 as ordinary light. The light 504 passing through the rutile 501 as ordinary light passes through the rutile 502 as extraordinary light and is refracted in a direction parallel to the x-y plane at −45° relative to the x-axis.

At this time, upon looking at the optical emission point of the PANDA fibers through the rutile 501 and the rutile 502, two virtual images are observed at positions symmetrical with respect to the x-z plane.

In this way, as when using the polarization splitter constituted by the rutile 111, half-phase retardation film 112, and rutile 113 in FIG. 1A, the optical paths of light emitted from the polarization-maintaining waveguide unit can be branched when using a polarization splitter constituted by the rutile 501 and 502 as well. Furthermore, this modification offers the advantage of not requiring a half-phase retardation film.

(Measurement Apparatus)

Figure 6:
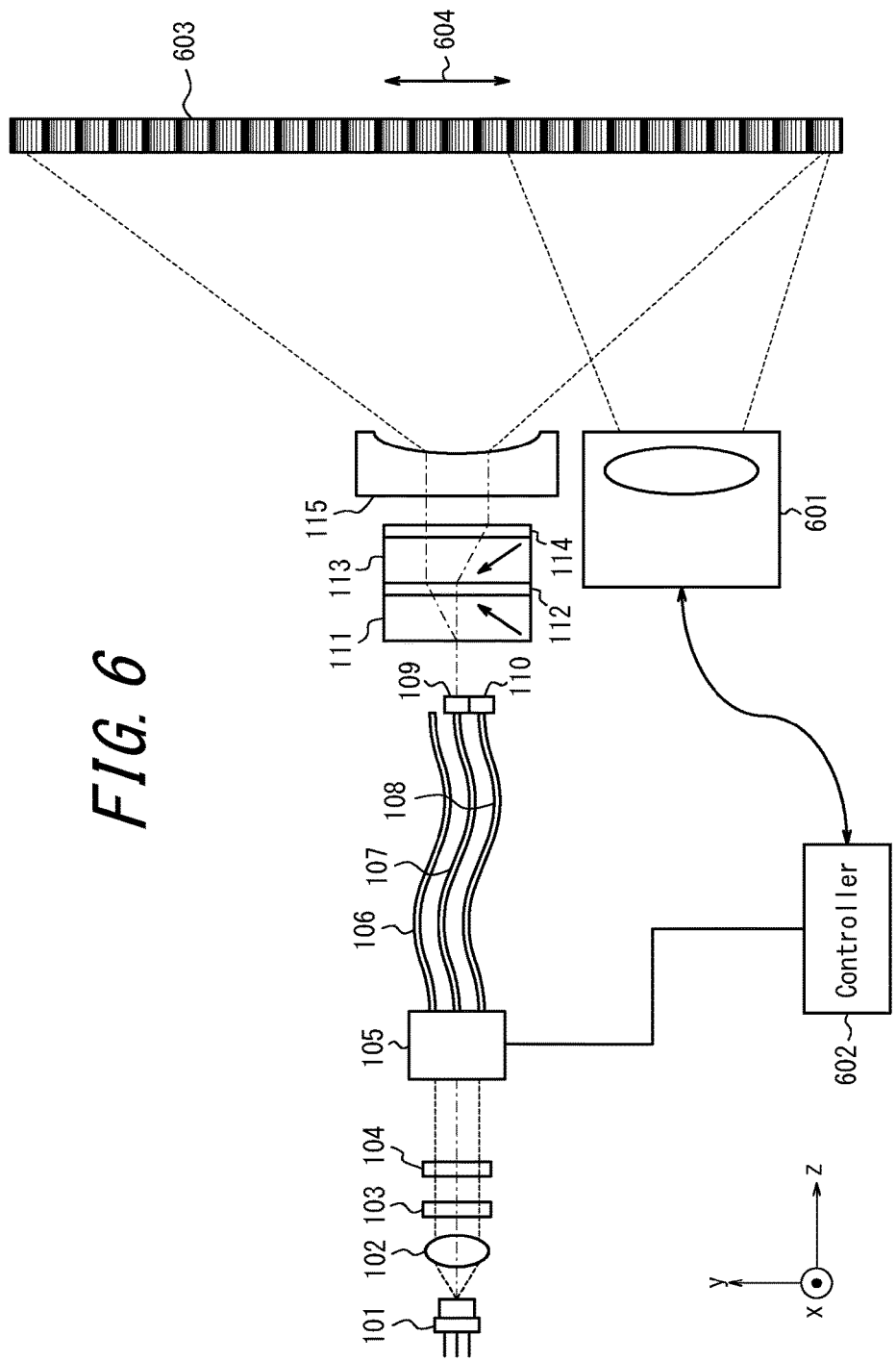
FIG. 6 illustrates the configuration of a measurement apparatus using the interference fringe projection apparatus according to Embodiment 1.

Next, with reference to FIG. 6, a measurement apparatus is described. FIG. 6 illustrates the configuration of a measurement apparatus using the interference fringe projection apparatus according to Embodiment 1. The measurement apparatus includes the above-described interference fringe projection apparatus, a camera 601, and a controller 602. The camera 601 is placed at a distance from the wide-angle projection lens 115 in the scanning direction 604 of the interference fringe pattern 603. The camera 601 captures images in accordance with a control signal from the controller 602. The controller 602 is, for example, implemented by computer hardware provided with a CPU and a memory, is connected electrically to the optical switch 105, and selects the PANDA fiber 106, 107, or 108 that outputs the light emitted from the semiconductor laser 101. The controller 602 also functions as a calculator that derives the shape of an object using the interference fringe in an image of the object captured by the camera 601 and the positional relationship between the wide-angle projection lens 115 of the interference fringe projection apparatus and the camera 601. The measurement apparatus is not limited to the interference fringe projection apparatus according to Embodiment 1 and may be configured similarly when using the interference fringe projection apparatus according to any of Embodiments 2 to 4 below.

By using the interference fringe projection apparatus illustrated in FIG. 1A, this measurement apparatus can reduce the shift, in the interference fringe, due to the effect of external heat or bending, can project a plurality of interference fringes with different phases, and can measure the shape of an object.

In this embodiment, the number of PANDA fibers 106, 107, and 108 is not limited to three, and any number of PANDA fibers may be used. Furthermore, the amount of retardation of the retarders arranged at the emission end of the PANDA fibers can be set to a variety of values.

Embodiment 2

Figure 7A:
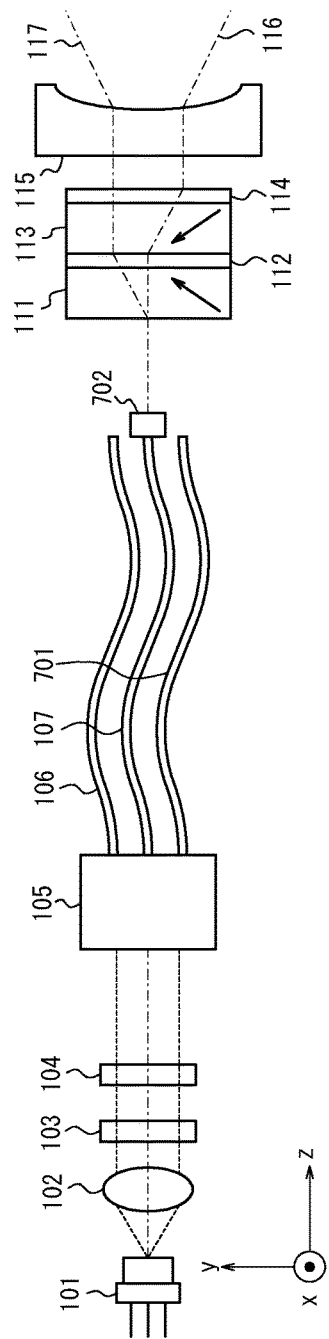
FIGS. 7A and 7B illustrate the configuration of an interference fringe projection apparatus according to Embodiment 2, where
Figure 7B:
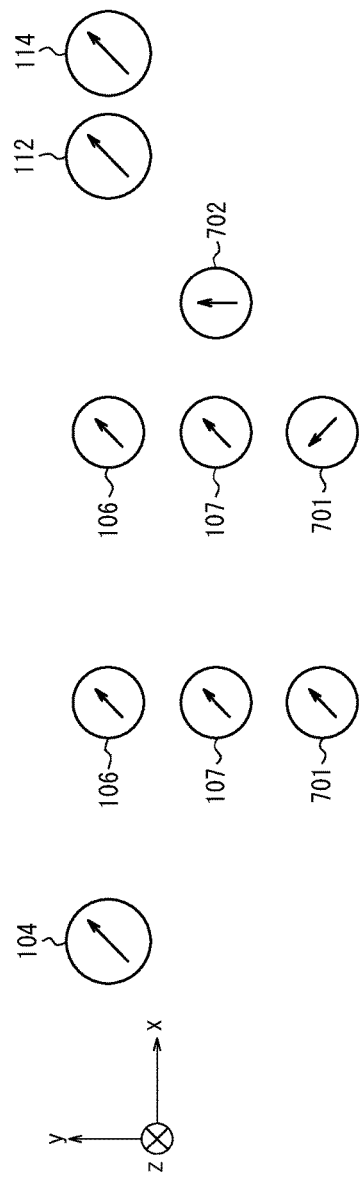

FIGS. 7A and 7B illustrate the configuration of an interference fringe projection apparatus according to Embodiment 2, where FIG. 7A is a configuration diagram of an optical system, and FIG. 7B illustrates the orientation of each optical element.

In Embodiment 2, a PANDA fiber 701 is provided instead of the PANDA fiber 108 of Embodiment 1. The PANDA fiber 701 is arranged so that the slow axis is parallel to the x-y plane and at a +45° angle relative to the x-axis at the incident end and is at a −45° angle at the emission end. In other words, the PANDA fiber 701 is twisted between the incident end and the emission end so that the direction of the slow axis rotates. As a result, without providing a retarder at the emission end of the PANDA fiber 701, the emitted polarized light is equivalent to when a half-wave plate is arranged with the optical axis thereof parallel to the y-direction. Furthermore, a quarter-wave plate 702 is provided at the emission end of the PANDA fiber 107 instead of the one-third-wave plate 109 of Embodiment 1. The optical axis of the retarder in this case is arranged in parallel with the y-direction. Accordingly, in Embodiment 2, the polarization-maintaining waveguide unit is constituted by the PANDA fibers 106, 107, and 701 and the quarter-wave plate 702. Since the remaining configuration is similar to that of Embodiment 1, identical constituent elements are labeled with the same reference signs, and a description thereof is omitted.

With the above configuration, only linearly polarized light in the slow axis direction is incident on the PANDA fibers 106, 107, and 701, and the phase difference between the polarized light parallel to the x-direction and the polarized light parallel to the y-direction is respectively 0 rad, π/2 rad, and π rad for the light emitted from the PANDA fiber 106, the quarter-wave plate 702, and the PANDA fiber 701. The shift, in the interference fringe, due to the effect of external heat or bending can therefore be reduced, and a plurality of interference fringes with different phases can be projected, as in Embodiment 1. Furthermore, since the PANDA fiber 701 rotates the slow axis direction, a phase difference of π rad can be provided relative to the polarized light emitted from the PANDA fiber 106 without providing a retarder at the emission end.

Embodiment 3

FIGS. 8A and 8B illustrate the configuration of an interference fringe projection apparatus according to Embodiment 3, where FIG. 8A is a configuration diagram of an optical system, and FIG. 8B illustrates the orientation of each optical element.

This interference fringe projection apparatus has the configuration of the interference fringe projection apparatus of Embodiment 1 illustrated in FIG. 1A, with a half-wave plate unit 801 being provided between the polarizing plate 104 and the optical switch 105. Furthermore, only two PANDA fibers 106 and 107 are connected to the optical switch 105, and a quarter-wave plate 803 (retarder) is disposed at the emission end of the PANDA fiber 107. In addition to the semiconductor laser 101, collimator lens 102, half-wave plate 103, polarizing plate 104, and optical switch 105, the light source unit in Embodiment 3 includes the half-wave plate unit 801, and the polarization-maintaining waveguide unit includes the PANDA fibers 106 and 107 and the quarter-wave plate 803.

The half-wave plate unit 801 includes a half-wave plate 802 and a non-illustrated half-wave plate rotation system and rotates the optical axis of the half-wave plate 802 about the z-axis in accordance with a control signal from a non-illustrated controller. In particular, the direction of the optical axis is switched between 45° and 90° relative to the x-axis. The quarter-wave plate 803 is arranged between the PANDA fiber 107 and the rutile 111 so that the optical axis thereof is in the y-direction. Since the remaining configuration is similar to that of Embodiment 1, identical constituent elements are labeled with the same reference signs, and a description thereof is omitted.

With the above configuration, light emitted from the semiconductor laser 101 is formed as a parallel light beam by the collimator lens 102, passes through the half-wave plate 103, the polarizing plate 104, and the half-wave plate unit 801 and is guided through the optical switch 105 to one of the PANDA fibers 106 and 107. Here, the phase of the light emitted from the PANDA fibers 106 and 107 is changed by switching the direction of the optical axis of the half-wave plate 802.

When the optical axis of the half-wave plate 802 is 45° relative to the x-axis, the light that can exist in the PANDA fibers 106 and 107 is only linearly polarized light parallel to the slow axis. When the phase of the light passing through the PANDA fiber 106 is 0 rad, the phase of the light passing through the PANDA fiber 107 and the quarter-wave plate 803 is rad. On the other hand, when the optical axis of the half-wave plate 802 is 90° relative to the x-axis, the light that can exist in the PANDA fibers 106 and 107 is only linearly polarized light parallel to the fast axis. Therefore, the phase of the light passing through the PANDA fiber 106 is π rad, and the phase of the light passing through the PANDA fiber 107 and the quarter-wave plate 803 is 3π/2 rad.

Here, Table 1 summarizes the results of the phase difference between the x-direction and y-direction components of polarized light based on the orientation of the optical axis of the half-wave plate 802, the light emitted from the PANDA fiber 106, and the light that passes through the PANDA fiber 107 and is emitted from the quarter-wave plate 803.

TABLE 1

| | PANDA fiber 106 | PANDA fiber 107 |
|---|---|---|
| 45° | 0 rad | π/2 rad |
| 90° | π rad | 3π/2 rad |

As in Embodiment 1, the optical path of the light emitted from the PANDA fiber 106 and the light that passes through the PANDA fiber 107 and is emitted from the quarter-wave plate 803 is branched by the polarization direction through the rutile 111, half-phase retardation film 112, and rutile 113. Each of the branched light beams 116, 117 passes through the polarizing film 114 to become linearly polarized light having a polarization component only in the transmission axis direction of the polarizing film 114. The light transmitted by the polarizing film 114 is formed into an illumination light beam by the wide-angle projection lens 115. The illumination light projected at this time forms an interference fringe. Four types of interference fringes with the phase differences listed in Table 1 can be formed.

In this way, by using the optical switch 105 to switch the PANDA fiber 106 or 107 that emits light and using the half-wave plate unit 801 to switch the polarized light guided to the PANDA fiber between polarized light parallel to the slow axis and polarized light parallel to the fast axis, the projected interference pattern can be switched between four patterns. Furthermore, since the light that can exist in the PANDA fibers 106 and 107 is only one of linearly polarized light that is parallel to the slow axis and linearly polarized light that is parallel to the fast axis, the polarization of the light emitted from the PANDA fibers 106 and 107 does not change because of bending or temperature changes of the PANDA fibers 106 and 107. In other words, the desired interference fringe pattern can be projected regardless of bending or temperature changes of the PANDA fibers 106 and 107.

Embodiment 4

Figure 9A:
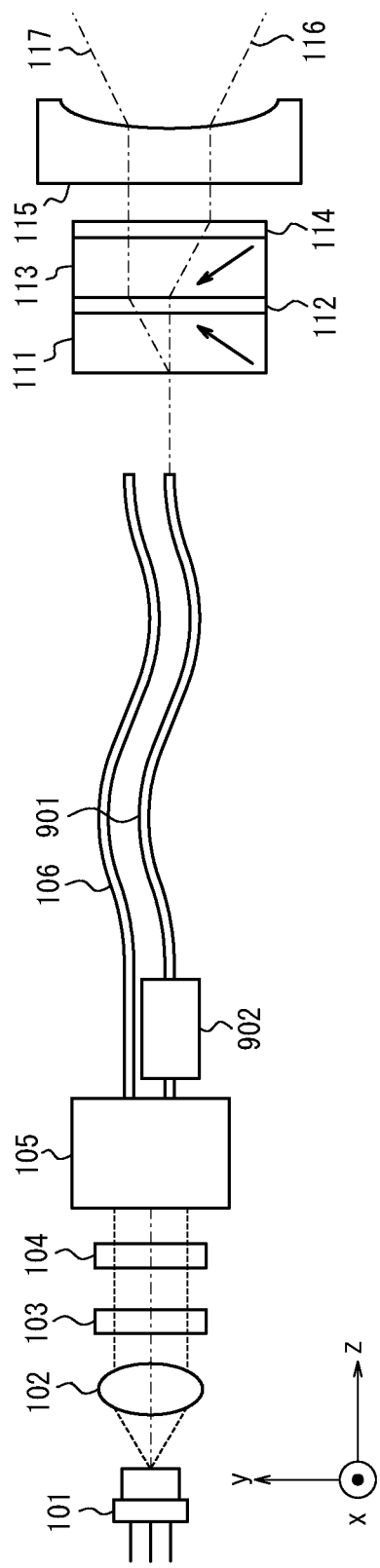
FIGS. 9A and 9B illustrate the configuration of an interference fringe projection apparatus according to Embodiment 4, where
Figure 9B:
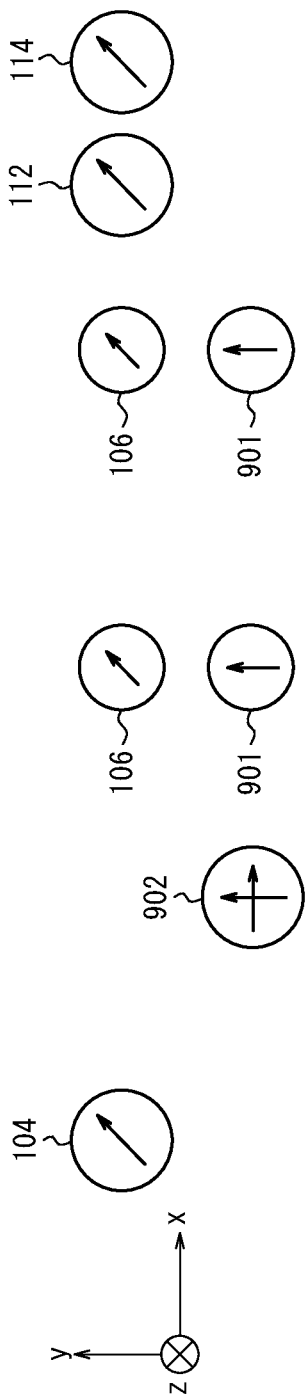

FIGS. 9A and 9B illustrate the configuration of an interference fringe projection apparatus according to Embodiment 4, where FIG. 9A is a configuration diagram of an optical system, and FIG. 9B illustrates the orientation of each optical element.

This interference fringe projection apparatus has a similar configuration to that of the interference fringe projection apparatus of Embodiment 1 illustrated in FIG. 1A, except for being connected to only two PANDA fibers 106 and 901 by the optical switch 105, and for a phase modulator 902 being disposed in the PANDA fiber 901. In Embodiment 4, the polarization-maintaining waveguide unit includes the PANDA fibers 106 and 901 and the phase modulator 902.

As in Embodiment 1, the polarizing plate 104 is arranged so that the transmission axis thereof is parallel to the x-y plane and at a 45° angle relative to the x-axis. The PANDA fiber 106 is arranged so that the slow axis thereof is parallel to the x-y plane and at a 45° angle relative to the x-axis. By disposing the polarizing plate 104 and the PANDA fiber 106 in this way, the light that can exist within the PANDA fiber 106 is only linearly polarized light that is parallel to the slow axis. In other words, the light source unit is configured to emit only linearly polarized light, in a direction along the slow axis that is one of the polarization-maintaining directions, to the PANDA fiber 106, which is at least one of the plurality of PANDA fibers 106 and 109. As in Embodiment 1, the light that passes through the PANDA fiber 106 passes through the rutile 111, half-phase retardation film 112, and rutile 113, the optical paths thereof diverge, the light is projected on an object through the polarizing film 114 and the wide-angle projection lens 115, and an interference fringe is formed.

On the other hand, the PANDA fiber 901 is arranged so that the slow axis thereof is in the y-direction. By arranging the polarizing plate 104 and the PANDA fiber 901 in this way, the light guided to the PANDA fiber 901 has two components, one along the slow axis and one along the fast axis, with equal amplitude. For the light guided to the PANDA fiber 901, the phase modulator 902 controls the phase difference of polarized light parallel to the slow axis and polarized light parallel to the fast axis.

Figure 10:
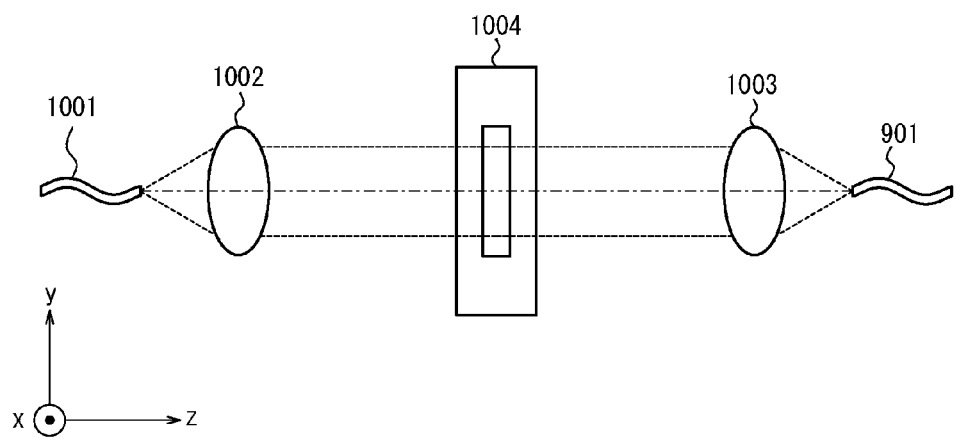
FIG. 10 illustrates the configuration of the phase modulator in FIG. 9A.

Next, the phase modulator is described with reference to FIG. 10. FIG. 10 illustrates the configuration of the phase modulator 902 in FIG. 9A. Light is incident on the phase modulator from the input port 1001, which is the tip of the PANDA fiber connected to the optical switch 105. The phase modulator includes a collimator lens 1002, a liquid crystal retarder 1004, and a coupling lens 1003. The light emitted from the input port 1001 is formed as parallel light by the collimator lens 1002, passes through the liquid crystal retarder 1004, and is coupled to the PANDA fiber 901 through the coupling lens 1003. In accordance with a control signal from a non-illustrated controller, the liquid crystal retarder 1004 provides a phase difference between the polarization component parallel to the x-direction and the polarization component parallel to the y-direction for light passing through the liquid crystal retarder 1004.

As a result, the light guided to the PANDA fiber 901 is provided with a desired polarization state by the phase modulator 902 and is emitted. Through the rutile 111, half-phase retardation film 112, and rutile 113, the optical paths of the emitted light are branched by the polarization direction. Each beam of the branched light passes through the polarizing film 114 to become linearly polarized light having a polarization component only in the transmission axis direction of the polarizing film 114. The light transmitted by the polarizing film 114 is formed into an illumination light beam by the wide-angle projection lens 115. The illumination light projected at this time forms an interference fringe.

Since the light that can exist in the PANDA fiber 106 is only linearly polarized light that is parallel to the slow axis, the polarization of the light emitted from the PANDA fiber 106 does not change because of bending or temperature changes of the PANDA fiber 106. In other words, the desired interference fringe pattern can be projected regardless of bending or temperature changes of the PANDA fiber 106. On the other hand, the polarization of light emitted from the PANDA fiber 901 changes in accordance with bending or temperature changes of the PANDA fiber 901. The polarization also changes in accordance with the phase modulation by the phase modulator 902.

Here, the polarized light emitted from the PANDA fiber 901 can be estimated by varying the phase modulation amount of the phase modulator 902 between $-\pi$ and $+\pi$ while also setting the modulation speed to be sufficiently greater than the speed at which the bending or temperature change of the PANDA fiber 901 causes the polarization state to change, and referring to the interference fringe pattern projected by the PANDA fiber 106. In other words, the phase difference upon obtaining the same pattern as the interference pattern projected by the PANDA fiber 106 is set to 0 rad, and using this phase difference as a standard, the phase difference when changing the phase modulation amount of the phase modulator 902 is estimated. As a result, even when external heat or bending occurs, an interference fringe can be provided with the desired phase difference, allowing the interference fringe to be scanned and the shape of an object to be measured by projecting a plurality of interference fringes. Furthermore, since the liquid crystal retarder 1004 with no mechanical driver is used as the phase modulator 902, the phase modulator 902 does not easily break down, and the phase can be switched at high speed.

(First Modification to Phase Modulator)

Figure 11:
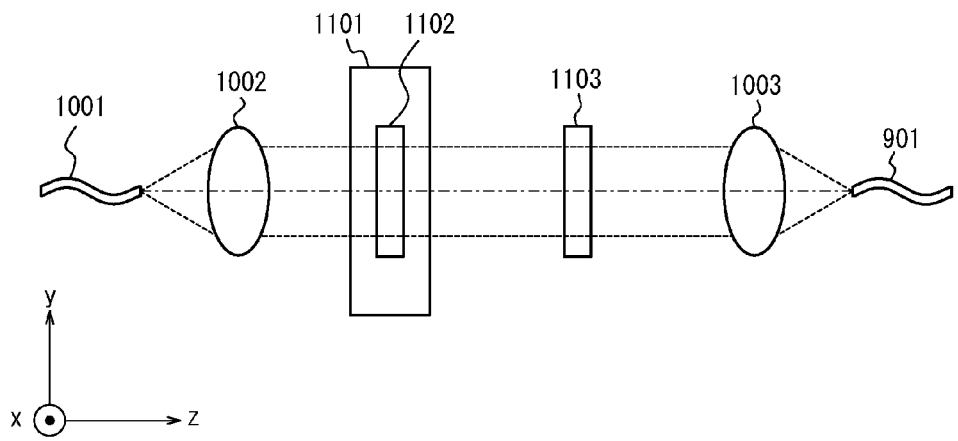
FIG. 11 illustrates a first modification to the phase modulator.

The phase modulator 902 of Embodiment 4 can be implemented by a variety of configurations. Modifications to the phase modulator are described below. FIG. 11 illustrates the first modification to the phase modulator.

This phase modulator includes a collimator lens 1002, a half-wave plate unit 1101, a quarter-wave plate 1103, and a coupling lens 1003. The light emitted from the input port 1001 is formed as parallel light by the collimator lens 1002, passes through the half-wave plate unit 1101 and quarter-wave plate 1103, and is coupled to the PANDA fiber 901 through the coupling lens 1003.

The half-wave plate unit 1101 includes a half-wave plate 1102 and a non-illustrated half-wave plate rotation system, and in accordance with a control signal from a non-illustrated controller, the rotation angle of the half-wave plate 1102 is controlled relative to the z-axis. The quarter-wave plate 1103 is arranged so that the optical axis thereof is parallel to the x-y plane and at a 45° angle relative to the x-axis. The phase difference of δ rad between the polarized light parallel to the x-direction and the polarized light parallel to the y-direction in the light emitted by the quarter-wave plate 1103 relative to the angle θ rad between the optical axis of the half-wave plate 1102 and the x-axis is given by δ=π/2−4θ.

(Second Modification to Phase Modulator)

Figure 12:
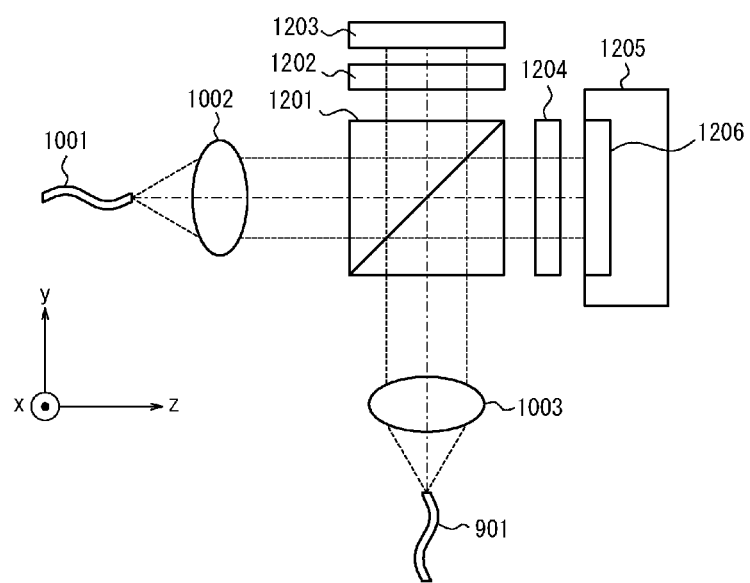
FIG. 12 illustrates a second modification to the phase modulator.

FIG. 12 illustrates the second modification to the phase modulator 902.

This phase modulator includes a polarization beam splitter 1201, quarter-wave plates 1202 and 1204, a flat mirror 1203, and a reflection-type phase modulator 1205.

The polarization beam splitter 1201 is arranged so that the beam splitter surface is perpendicular to the y-z plane, and a normal thereto is at a 45° angle relative to the z-axis. The polarization beam splitter 1201 reflects linearly polarized light parallel to the x-direction and transmits linearly polarized light parallel to the y-direction. The flat mirror 1203 is arranged in the y-direction of the polarization beam splitter 1201 so that the normal direction thereof is in the principal light ray direction of light reflected by the polarization beam splitter 1201. The reflection-type phase modulator 1205 is arranged in the z-direction of the polarization beam splitter 1201 so that the normal direction thereof is in the principal light ray direction of light transmitted by the polarization beam splitter 1201. The quarter-wave plate 1202 is arranged between the polarization beam splitter 1201 and the flat mirror 1203 so that the optical axis thereof is parallel to the x-z plane and at a 45° angle to the z-axis. The quarter-wave plate 1204 is arranged between the polarization beam splitter 1201 and the reflection-type phase modulator 1205 so that the optical axis thereof is parallel to the x-y plane and at a 45° angle to the y-axis.

The linearly polarized light incident from the input port 1001 and parallel to the x-direction is reflected by the polarization beam splitter 1201, passes though the quarter-wave plate 1202 to become circularly polarized light, and is reflected by the flat mirror 1203. The reflected, circularly polarized light passes though the quarter-wave plate 1202 to become linearly polarized light parallel to the y-direction, passes through the beam splitter surface of the polarization beam splitter 1201, and is incident on the coupling lens 1003. On the other hand, the linearly polarized light parallel to the y-direction passes through the beam splitter surface of the polarization beam splitter 1201, passes through the quarter-wave plate 1204 to become circularly polarized light, and is reflected by the reflection-type phase modulator 1205. The reflected, circularly polarized light passes though the quarter-wave plate 1204 to become linearly polarized light parallel to the x-direction, is reflected by the beam splitter surface of the polarization beam splitter 1201, and is incident on the coupling lens 1003.

The reflection-type phase modulator 1205 includes a flat mirror 1206 and a non-illustrated linear drive system. The flat mirror 1206 is disposed in the linear drive system. The linear drive system receives a control signal from a non-illustrated controller and adjusts the position of the flat mirror 1206 in the z-direction. As a result, the optical path length of light incident on the PANDA fiber 901 through the reflection-type phase modulator 1205 can be adjusted. In other words, the phase difference between the linearly polarized light parallel to the x-direction and the linearly polarized light parallel to the y-direction can be adjusted.

Liquid crystal on silicon (LCOS) may be used as the reflection-type phase modulator 1205.

(Third Modification to Phase Modulator)

Figure 13:
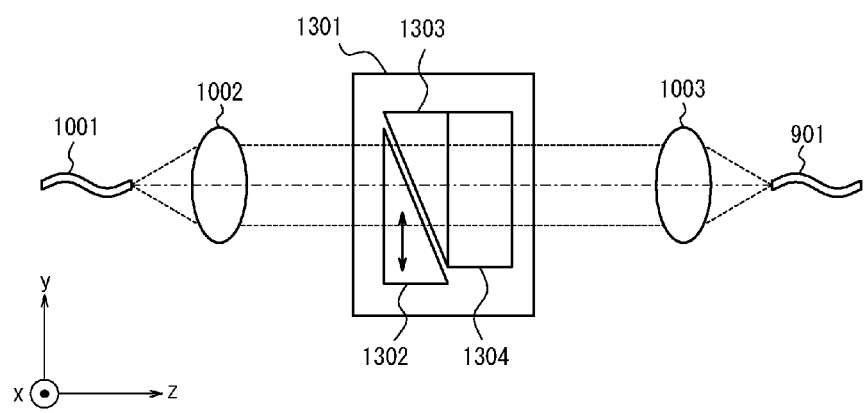
FIG. 13 illustrates a third modification to the phase modulator.

FIG. 13 illustrates the third modification to the phase modulator.

This phase modulator includes a Babinet-Soleil compensator 1301. The Babinet-Soleil compensator 1301 includes liquid crystals 1302, 1303, and 1304 and a non-illustrated linear drive system. The liquid crystals 1302 and 1303 have a shape that divides the flat plate of the left liquid crystal into two wedged prisms. The liquid crystal 1304 is the right liquid crystal and has the same thickness as that of the flat plate yielded by combining the liquid crystal 1302 and liquid crystal 1303. The liquid crystal 1302 is disposed in the non-illustrated linear drive system and is adjusted to any position in the y-direction in accordance with a control signal from a non-illustrated controller. The optical axes of the liquid crystals 1302, 1303 and of the liquid crystal 1304 are respectively arranged in a direction parallel to the y-axis and a direction parallel to the x-axis. As a result, the phase difference between the linearly polarized light parallel to the x-direction and the linearly polarized light parallel to the y-direction can be adjusted by changing the position of the liquid crystal 1302.

This disclosure is not limited to the above embodiments, and a variety of changes and modifications may be made. For example, the orientation of the x-direction and the y-direction, the orientation of the slow axis and the fast axis of the PANDA fibers 106, 107, and 108, the order of arrangement of the rutile 111 and 113, and the like above are only examples. For example, the orientation of the x-direction and the y-direction in the optical system overall, the orientation of the slow axis and the fast axis of the PANDA fibers 106, 107, and 108, and the order of the rutile 111 and the rutile 113 may be switched or otherwise changed while still obtaining similar effects. Furthermore, the optical crystals used in the polarization splitter are not limited to rutile ($TiO_2$). For example, a birefringent crystal such as calcite ($CaCO_3$), yttrium/vanadate ($YVO_4$), or the like may also be used.

The invention claimed is:

1. An interference fringe projection apparatus comprising:
   a light source unit configured to emit coherent light selectively from one of a plurality of optical emitters;
   a polarization-maintaining waveguide unit comprising a plurality of polarization-maintaining waveguides each configured to guide light emitted from one of the plurality of optical emitters;
   a polarization splitter configured to split an optical path of light emitted from the polarization-maintaining waveguides by polarization direction; and
   a polarizer configured to transmit only a linear polarization component in a particular direction of light split by the polarization splitter, thereby transmitting linearly polarized light, the linearly polarized light transmitted by the polarizer being projected so as to form an interference fringe pattern,
   wherein:
   the light source unit is configured to allow emission of only linearly polarized light in one polarization-maintaining direction for at least one polarization-maintaining waveguide among the plurality of polarization-maintaining waveguides, and
   the polarization-maintaining waveguide unit is configured to cause retardation of light emitted from the plurality of polarization-maintaining waveguides to vary for each polarization-maintaining waveguide, the polarization-maintaining waveguide unit including a retarder on an optical emission end side of at least one of the polarization-maintaining waveguides, wherein the retarder is arranged so that a direction of an optical axis of the retarder is in any one polarization direction split by the polarization splitter.

2. The interference fringe projection apparatus of claim 1, wherein the light source unit comprises one light source and an optical emitter selection unit configured to switch an optical path of light from the light source and to select one of the plurality of optical emitters.

3. The interference fringe projection apparatus of claim 1, wherein the light source unit comprises a plurality of light sources in one-to-one correspondence with the plurality of optical emitters and is configured to selectively cause one of the plurality of light sources to emit light.

4. The interference fringe projection apparatus of claim 1, wherein at least one polarization-maintaining waveguide among the plurality of polarization-maintaining waveguides is arranged so that a polarization-maintaining direction of the at least one polarization-maintaining waveguide is a direction that bisects a polarization direction of light split in the polarization splitter.

5. The interference fringe projection apparatus of claim 1, wherein the light source comprises a half-wave plate and a half-wave plate rotation system that rotates the half-wave plate and controls a polarization direction of light incident on the polarization-maintaining waveguide unit.

6. The interference fringe projection apparatus of claim 1, wherein the polarization-maintaining waveguide unit comprises a phase modulator configured to control a phase difference between two beams of polarized light that pass through at least one of the polarization-maintaining waveguides and are split by the polarization splitter.

7. A measurement apparatus comprising:
the interference fringe projection apparatus of claim 1;
an imager; and
a calculator,
wherein
the imager captures an image of an object, an interference fringe being projected on the object by the interference fringe projection apparatus, and
the calculator derives a shape of the object using the interference fringe in the image of the object and a positional relationship between the interference fringe projection apparatus and the imager.

\* \* \* \* \*